United States Patent
Jackson

[11] 3,925,360
[45] Dec. 9, 1975

[54] 2-BENZYL AZIRIDINES

[75] Inventor: John Lambert Jackson, Henley-on-Thames, England

[73] Assignee: John Wyeth & Brother Ltd., Taplow, England

[22] Filed: Dec. 5, 1973

[21] Appl. No.: 422,031

[30] Foreign Application Priority Data
Dec. 21, 1972 United Kingdom............ 59138/72

[52] U.S. Cl............................. 260/239 E; 424/244
[51] Int. Cl.$^2$..................................... C07D 203/08
[58] Field of Search .......................... 260/239 E

[56] References Cited
OTHER PUBLICATIONS
A. Hassner, J. Amer. Chem. Soc. 91, 5046 (1969).
Alverne et al., Index Chemical 42, 178925 (1971).
Kashelkar et al., C.A. 55, 5450d (1961).
Brewster et al.; J. Med. Chem. 15, 1078–1079 (1972).

Primary Examiner—Donald G. Daus
Assistant Examiner—Mark L. Berch

[57] ABSTRACT

Aziridines of the formula (I)

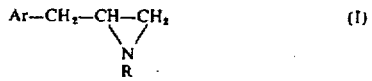

and the pharmaceutically acceptable acid addition salts thereof, in which Ar is a phenyl group optionally substituted by one or more hydroxy, halo, lower alkyl, lower alkoxy, halo(lower)alkyl, nitro, amino or mono- or di-(lower)alkyl-amino groups and R is hydrogen or lower alkyl possess anorectic properties. The appetite of a mammal may be inhibited by administering to it an aziridine of formula (I) or a pharmaceutically acceptable acid addition salt thereof. Aziridines of formula (I) in which Ar and R have the above defined meanings with the proviso that R is lower alkyl when Ar is phenyl, p-chlorophenyl or p-methoxyphenyl are novel compounds.

5 Claims, No Drawings

2-BENZYL AZIRIDINES

This invention relates to heterocyclic compounds. More specifically it relates to certain aziridines, to pharmaceutical compositions containing the aziridines and to methods of preparing and using them.

More particularly the invention is concerned with aziridines of the general formula (I)

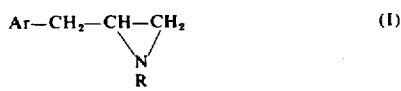

and the pharmaceutically acceptable acid addition salts thereof, wherein Ar is a phenyl group optionally substituted by one or more hydroxy, halo, lower alkyl, lower alkoxy, halo(lower)alkyl, nitro, animo or mono- or di-(lower)alkylamino groups and R is hydrogen or lower alkyl.

We have found that aziridines of the above general formula (I) possess anorectic properties. Accordingly the present invention provides a method of inhibiting the appetite of a mammal by administering to the mammal an anorectic amount of an aziridine of genral formula (I) or a pharmaceutically acceptable acid addition salt thereof. Although the mammal may be non-human, preferably it is a human.

The aziridine may be administered to the mammal in the form of a pharmaceutical composition comprising the active compound in association with a pharmaceutical carrier.

The invention further provides a pharmaceutical composition having anorectic properties comprising an aziridine of general formula (I) as hereinabove defined or a pharmaceutically acceptable acid addition salt thereof in association with a solid pharmaceutical carrier.

The term "lower" as used herein means that the radical referred to contains up to 6, preferably up to 4 carbon atoms.

In the compounds of formula (I) the phenyl group Ar may be substituted or unsubstituted. Suitable substituents are hydroxy, halogen (for example, fluorine, chlorine or bromine), lower alkyl (for example methyl, ethyl, propyl or butyl), lower alkoxy (for example methoxy, ethoxy, propoxy, or butoxy,) halo(lower)alkyl (for example trifluoromethyl), nitro and amino or mono or di-(lower)alkylamino (for example dimethylamino). The phenyl group may be substituted by more than one substituent. Preferred substituents are halogen and trifluoromethyl.

The group R may be hydrogen or lower alkyl, for example methyl, ethyl, propyl, or butyl.

Certain of the compounds of general formula (I) are novel and the present invention also provides these novel compounds. The novel compounds are those of general formula (I) and their pharmaceutically acceptable acid addition salts in which Ar and R have the meanings hereinbefore defined with the proviso that when Ar is phenyl, p-chlorophenyl or p-methoxyphenyl then R is a lower alkyl. The invention further provides a pharmaceutical composition comprising a novel compound of general formula (I) or a pharmaceutically acceptable acid addition salt thereof in association with a pharmaceutical carrier.

Particularly preferred novel compounds of general formula (I) are those in which Ar is trifluoromethylphenyl, e.g. m-trifluoromethylphenyl, especially such compounds in which R is hydrogen or ethyl. The compounds in which Ar is trifluoromethylphenyl are particularly valuable since, in general, they have very little undesirable stimulant activity as measured by standard pharmacological tests.

The compounds of general formula (I), including the novel compounds, may be prepared by methods known in the art for preparing aziridines. For example, compounds of formula (I) in which R is hydrogen may be prepared by the Wenker method (see, for example, Brois, J. Org. Chem. 1962, 27, 3532 and Kashelikar et al., J. Amer. Chem. Soc., 1960, 82, 4930) in which a sulphate ester of an amino alcohol of general formula

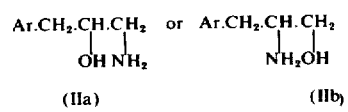

is cyclised by treatment with alkali. The alkali may be, for example, sodium hydroxide. The sulphate esters may be prepared by esterification of the amino alcohols with sulphuric acid. The amino alcohol, preferably has the formula (IIb). The amino alcohols are described in the literature or may be prepared by methods known for preparing analogous compounds, for example by reduction of the corresponding amino acids.

An alternative method of preparing aziridines of general formula (I) in which R is hydrogen comprises reduction of an oxime of general formula

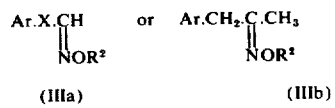

wherein Ar has the meaning hereinabove defined, X is $CH_2CH_2$ or $-CH=CH-$ and $R^2$ is hydrogen, acyl, alkyl, aryl or aralkyl.

The oximes of general formulae (IIIa) and (IIIb) may be reduced with complex metal hydrides such as lithium aluminium hydride. The oximes of general formulae (IIIa) and (IIIb), are described in the literature or they may be prepared by methods known for preparing analogous oximes.

In a third method of preparing an aziridine of general formula (I) in which R is hydrogen a haloamine of general formula

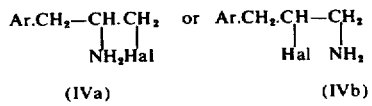

wherein Ar has the meaning given above and Hal is halogen, preferably bromo, may be cyclised with the elimination of hydrogen halide by treatment with a base such as an alkali metal hydroxide, e.g. potassium hydroxide. The haloamines of formulae (IVa) and (IVb) may be prepared by known methods.

The aziridines of general formula (I) in which R is lower alkyl may be prepared by alkylating a compound of general formula (I) in which R is hydrogen. For example the compound in which R is hydrogen may be reacted with a lower alkyl halide (e.g. a lower alkyl bromide such as ethyl bromide).

The compounds of formula (I) are capable of forming acid addition salts with acids, particularly pharmaceutically acceptable acids, and the invention also relates to such salts. The salts may be isolated directly from the processes described above or prepared by dissolving the specific compound of formula (I) as its base in a suitable organic solvent, and treating it with a solution of the selected acid, in accordance with conventional procedures for preparing addition salts from base compounds generally. The aziridines tend to be unstable in strong mineral acids and therefore the acid addition salts are preferably prepared from pharmaceutically acceptable organic acids. As examples of acids, there may be used any of tartaric, maleic, citric, acetic or benzoic acid.

As mentioned hereinabove we have found, in general, that the aziridines of general formula (I) and their pharmaceutically acceptable acid addition salts have anorectic properties. Aziridines have been tested for anorectic properties by the following procedure:

Male Charles River rats between 120 to 140 grams are trained to drink sweetened condensed milk from a graduated drinking tube. After a short learning period the animals are placed on a routine of water ad lib for 24 hours, standard laboratory chow for 22 hours and sweetened condensed milk for 2 hours. The volume of milk consumed is measured at 30 minutes as well as 2 hours. The animals are weighed every day. This schedule is maintained 5 days a week over a period of several months. The compounds are then administered and changes in milk consumed and 24 hour weight changes are compared to the average of the two days before drug administration. Animals are tested as groups of six and one group is given saline each week to serve as controls.

When tested by this procedure 2-benzylaziridine on administration intraperitoneally at 10 mg/kg. produced a 31.2% (± 11.5%) inhibition of appetite. When administered per os the compound produced a 39.8% (± 3.8%) inhibition of appetite.

Aziridines of general formula (I) have also been tested for anorectic properties by an alternative procedure:

Groups of 8 or 10 male mice weighing 22 to 24 grams are starved overnight, although access to water is not restricted. The animals are dosed orally or intraperitoneally with the test drug or vehicle alone (control) 1 hour before they are placed individually into glass jars. The jars (100mm diameter × 80mm high) have lids fitted with a glass tube to accommodate a stick of spaghetti of approximate length of 450 mm. The glass tube is arranged such that only 5mm of spaghetti is exposed for eating by the mouse. The length of spaghetti eaten during a two hour test period is indicative of the appetite of the animal. The percentage anorexia can be determined by the expression:

$$\frac{(\text{Mean length eaten control} - \text{mean length eaten test})}{\text{Mean length eaten control}} \times 100$$

When tested in this alternative procedure 2-(3-trifluoromethyl)benzylaziridine on administration intraperitoneally at 50 mg/kg. showed 73% anorexia and on administration per os at 100 mg/kg showed 80% anorexia. In the same procedure 1-ethyl-2-(3-trifluoromethyl)benzylaziridine showed 66% anorexia when administered intraperitoneally at 100 mg/kg.

Any suitable carrier kown in the art can be used to prepare the pharmaceutical compositions of the present invention. When the active ingredient is a novel aziridine the carrier may be solid, liquid or a mixture of solid and liquid. If the aziridine is known the carrier is solid. Solid form compositions include powders, tablets and capsules. A solid carrier can be one or more substances which may also act as flavouring agents, lubricants, solubilisers, suspending agents, binders, or tablet-disintegrating agents; it can also be an encapsulating material. In powders the carrier is a finely divided solid which is in admixture with the finely divided active ingredient. In tablets the active ingredient is mixed with a carrier having the necessary binding properties in suitable proportions and compacted in the shape and size desired. The powders and tablets preferably contain from 5 to 99, preferably 10–80% of the active ingredient. Suitable solid carriers are magnesium carbonate, magnesium stearate, talc, sugar, lactose, pectin, dextrin, starch, gelatin, tragacanth, methyl cellulose, sodium carboxymethyl cellulose, a low melting wax, and cocoa butter. The term "composition" is intended to include the formulation of an active ingredient with encapsulating material as carrier to give a capsule in which the active ingredient (with or without other carriers) is surrounded by carrier, which is thus in association with it. Similarly cachets are included.

Liquid form compositions include solutions, suspensions, emulsions, syrups and elixirs. The active ingredient can be dissolved or suspended in a pharmaceutically acceptable liquid carrier which can be sterile such as sterile water, sterile organic solvent or a mixture of both. Preferably a liquid carrier is one suitable for parenteral injection. Where the active ingredient is sufficiently soluble it can be dissolved in normal saline as a carrier; if it is too insoluble for this it can often be dissolved in a suitable organic solvent, for instance aqueous propylene glycol or polyethylene glycol solutions. Aqueous propylene glycol containing from 10 to 75% of the glycol by weight is generally suitable. In other instances compositions can be made by dispersing the finely-divided active ingredient in aqueous starch or sodium carboxymethyl cellulose solution, or in a suitable oil, for instance arachis oil. Liquid pharmaceutical compositions which are sterile solutions or suspensions can be utilised by intramuscular, intraperitoneal or subcutaneous injection. In many instances a compound is orally active and can be administered orally either in liquid or solid composition form.

Preferablly the pharmaceutical composition is in unit dosage form. In such form, the composition is subdivided in unit doses containing appropriate quantities of the active ingredient; the unit dosage form can be a packaged composition, the package containing specific quantities of compositions, for example packeted powders or vials or ampoules. The unit dosage form can be a capsule or tablet itself, or it can be the appropriate number of any of these in packaged form. The quantity of active ingredient in a unit dose of composition may be varied or adjusted from 5 mg. or less to 500 mg. or more (preferably 10 to 100 mg.), according to the particular need and the activity of the active ingredient. The invention also includes the compounds in the absence of carrier where the compounds are in unit dosage form.

The following Preparation A illustrates the preparation of a known aziridine.

PREPARATION A

2-Benzylaziridine

1-Phenyl-2-amino-3-propyl sulphate (10.16 g.) was suspended in water (35 ml.). Sodium hydroxide pellets (9.24 g.) were added and the mixture heated to the boiling point, whereon the solids dissolved. The aziridine separated from solution as an oily layer and was steam distilled into a cooled receiver containing ether (50 ml.) until a fresh portion of the distillate gave a neutral reaction. The contents of the receiver were well shaken, and the organic phase separated, dried ($MgSO_4$), filtered and evaporated to give the title compound as a mobile oil (4.60 g.). G.l.c. showed a purity of 98%.

Analysis: Found: C, 80.85; H, 8.37; N, 10.65. $C_9H_{11}N$ requires: C, 81.16; H, 8.33; N, 10.52%.

The following Examples illustrate the invention:

EXAMPLE 1

1-Ethyl-2-benzylaziridine

2-Benzylaziridne (0.886 g.) and ethyl bromide (1.09 g.) were stirred in dimethylformamide (5 ml.) containing triethylamine (1.5 ml.) for 18 hr. The resulting suspension was poured into water (75 ml.) and extracted with ether. Evaporation of the ether phase afforded the title compound as a pale yellow oil (0.811 g.).

Analysis: Found: C, 81.71; H, 9.23; N, 8.76 $C_{11}H_{15}N$ requires: C, 81.93; H, 9.38; N, 8.69%.

EXAMPLE 2

2-(3-Trifluoromethyl)benzylaziridine a. 2-Amino-3-(3-trifluoromethyl)phenylpropan-1-ol, O-sulphate ester 2-Amino-3-(3-trifluoromethyl)phenylpropan-1-ol (J. Amer. Chem. Soc., 56, 73, 1951; 12.84 g.) was stirred in water (80 ml.) and concentrated sulphuric acid (8.0 g.) was added dropwise with stirring. The mixture was heated on a steam bath for 45 minutes and then evaporated under reduced pressure keeping the temperature at 100°C until all water had been removed. The semi-solid residue was triturated in acetone and filtered to give the O-sulphate ester (14.23 g.), m.p. >265°C (d).

Analysis: Found: C, 40.19; H, 4.33; N, 4.95. $C_{10}H_{12}F_3NO_4S$ requires: C, 40.14; H, 4.04; N, 4.68%.

b. 2-(3-Trifluoromethyl)benzylaziridine

The O-sulphate ester [from part (a)]was suspended in water (35 ml.) containing sodium hydroxide (10.4 g.) and distilled into a receiver containinig ether (200 ml.) over sodium hydroxide pellets (5 g.). Distillation was continued (more water being added to the distillation flask as necessary) until a clear distillate was obtained. The ether was washed with water until neutral, dried ($MgSO_4$) and evaporated to give the title compound as a colourless oil, (6.85 g.).

Analysis: Found: C, 60.07; H, 5.29; N, 6.49. $C_{10}H_{10}F_3N$ requires: C, 59.70; H, 5.01; N, 6.96%.

EXAMPLE 3

1-Ethyl-2-(3-trifluoromethyl)benzylaziridine 2-(3-Trifluoromethyl)benzylaziridine (1.50 g.) was stirred in dimethylformamide (5 ml.) containing ethyl bromide (1.62 g.) and triethylamine (1.5 ml.) for 18 hours. The resulting suspension was poured into water (50 ml.) and extracted with ether. The ether phase was washed until neutral with water, dried ($MgSO_4$) and evaporated to give the title compound as a pale yellow oil, (1.52 g.).

Analysis: Found: C, 63.16; H, 6.48; N, 6.11. $C_{12}H_{14}F_3N$ requires: C, 62.87; H, 6.16; N, 6.11%.

EXAMPLE 4

2-(3,4-Dichlorobenzyl)-aziridine a. 2-Amino-3-(3,4-dichlorophenyl)propan-1-ol To a stirred suspension of lithium aluminium hydride (5.0 g.) in dry tetrahydrofuran (200 ml.) was added 2-amino-3-(3,4-dichlorophenyl)propionic acid (11.705 g.) portionwise. The reaction mixture was refluxed 3 hours, cooled, and distilled water (15 ml.) was added dropwise. The inorganic precipitate was filtered off, washed well with ether and the combined filtrate and washings were evaporated to give 2-amino-3-(3,4-dichlorophenyl)propane-1-ol (9.572 g.). This was converted to the hydrochloride in ethanolic hydrogen chloride-ether to yield 8.400 g., m.p. 189.2°C (dec.).

$C_9H_{11}Cl_2NO.HCl$ requires; C, 42.13; H, 4.72; N, 5.46. Found: C, 42.24; H, 4.90; N, 5.46%.

b. 2-Amino-3-(3,4-dichlorophenyl)propan-1-ol, O-sulphate ester

2-Amino-3-(3,4-dichlorophenyl)propan-1-ol (5.077 g.) was mixed with concentrated sulphuric acid (2.262 g.) and water (8 ml.) and the reaction mixture was evaporated to dryness at 100°C. Trituration of the residue in acetone-ether gave the pure title compound (4.119 g.) m.p. 271.6°C (dec.).

$C_9H_{11}Cl_2NSO_4$ requires: C, 36.01; H, 3.69; N, 4.67. Found: C, 36.25; H, 3.79; N, 4.62%.

c. 2-(3,4-dichlorobenzyl)aziridine

A suspension of 2-amino-3-(3,4-dichlorophenyl)propan-1-ol, O-sulphate ester (7.00 g.) in sodium hydroxide (6.00 g.) and water (35 ml.) was heated to reflux temperature and distilled while adding water to the distillation flask at intervals to maintain the level of liquid. The product was steam-distilled and was collected in a flask containing ether (100 ml.) over sodium hydroxide pellets (5 g.). Separation, drying ($MgSO_4$) and evaporation of the ether layer gave the title aziridine (2.781 g.).

$C_9H_9Cl_2N$ requires : C, 53.49; H, 4.49; N, 6.93. Found : C, 53.26; H, 4.89; N, 7.38%.

To 2-(3,4-dichlorobenzyl)aziridine (1.448 g.) was added maleic acid (832 mg.) in ether (10 ml.) and after a few minutes the maleate crystallised and was filtered off and the title compound obtained as the hydrogen maleate, quarter hydrate (2.212 g.,) m.p. 93°C (softens).

$C_9H_9Cl_2N.C_4H_4O_4.¼H_2O$ requires : C, 48.38; H, 4.22; N, 4.34. Found : C, 48.56; H, 4.20; N, 4.47%

EXAMPLE 5

Capsules

| | |
|---|---:|
| 2-Benzylaziridine | 35 mg. |
| Lactose BP | 140 |
| Amberlite IRP 88[1] | 4.1 |
| Magnesium stearate BP | 0.9 |
| | 180.0 |

[1]Potassium salt of a cation exchange resin of the carboxylic type.

Batches of lactose, Amberlite IRP 88 and magnesium stearate are sieved through a 40 mesh (British Standard) screen. The active ingredient is disposed on the lactose. The lactose - active ingredient mixture is blended with the other excipients and filled into hard gelatin capsules.

EXAMPLE 6
Tablets

| | |
|---|---|
| 2-Benzylaziridine | 35.00 mg. |
| Lactose BP | 133.75 |
| Avicel[1] | 30.00 |
| Amberlite IRP 88[2] | 1.00 |
| Magnesium stearate BP | 0.25 |
| | 200.00 |

[1]Microcrystalline cellulose
[2]Potassium salt of a cation exchange resin of the carboxylic type.

Batches of lactose, Amberlite IRP 88, Avicel and magnesium stearate are sieved through a 40 mesh (British Standard) sieve. The active ingredient is dispersed on the lactose. The lactose-active ingredient mixture is blended with the other excipients and compressed to form tablets.

What is claimed is:

1. A compound selected from the group consisting of aziridines of the formula

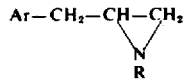

and the pharmaceutically acceptable salts thereof, in which Ar is a member of the group consisting of trifluoromethylphenyl and dichlorophenyl and R is hydrogen or lower alkyl.

2. A compound as defined in claim 1 in which Ar is trifluormethylphenyl.

3. A compound as defined in claim 1 which is 1-ethyl-2-(3-trifluoromethyl)benzylaziridine.

4. A compound as defined in claim 1 which is 2-(3-tri-fluoromethyl)benzylaziridine.

5. A compound as defined in claim 1 which is 2-(3,4-dichlorobenzyl)aziridine.

* * * * *